(12) United States Patent
Redana et al.

(10) Patent No.: US 9,503,174 B2
(45) Date of Patent: Nov. 22, 2016

(54) DIVIDE-AND-CONQUER APPROACH TO MITIGATING RELAY-TO-RELAY INTERFERENCE

(75) Inventors: Simone Redana, Munich (DE);
Abdallah Bou Saleh, Munich (DE);
Omer Bulakci, Munich (DE);
Bernhard Raaf, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/002,780

(22) PCT Filed: Mar. 4, 2011

(86) PCT No.: PCT/EP2011/053317
§ 371 (c)(1),
(2), (4) Date: Sep. 3, 2013

(87) PCT Pub. No.: WO2012/119636
PCT Pub. Date: Sep. 13, 2012

(65) Prior Publication Data
US 2013/0344801 A1    Dec. 26, 2013

(51) Int. Cl.
*H04B 1/10* (2006.01)
*H04B 7/155* (2006.01)
*H04W 72/08* (2009.01)
*H04W 28/04* (2009.01)
*H04B 7/26* (2006.01)
*H04W 36/20* (2009.01)
*H04W 84/04* (2009.01)

(52) U.S. Cl.
CPC ....... *H04B 7/15585* (2013.01); *H04W 72/082* (2013.01); *H04B 7/15528* (2013.01); *H04B 7/15564* (2013.01); *H04B 7/2606* (2013.01); *H04W 28/048* (2013.01); *H04W 36/20* (2013.01); *H04W 84/047* (2013.01)

(58) Field of Classification Search
CPC ............ H04B 7/2606; H04B 7/15542; H04B 7/15507; H04B 7/15528; H04B 7/15564; H04W 28/048; H04W 36/0066; H04W 36/12; H04W 36/20; H04W 72/121; H04W 84/047
USPC .......... 455/296, 436, 444, 447, 452.1, 452.2
See application file for complete search history.

(56) References Cited

U.S. PATENT DOCUMENTS

| 5,371,734 | A | * | 12/1994 | Fischer | 370/311 |
| 5,448,753 | A | * | 9/1995 | Ahl et al. | 455/422.1 |
| 6,546,254 | B2 | * | 4/2003 | Fitzgerald | 455/447 |

(Continued)

OTHER PUBLICATIONS

3GPP TSG-RAN WG1 #56, Feb. 9-13, 2009, Athens, Greece, R1-090877, "Specification Impact of L3 Relays", Qualcomm Europe, 3 pgs.

(Continued)

*Primary Examiner* — Duc M Nguyen
(74) *Attorney, Agent, or Firm* — Harrington & Smith

(57) ABSTRACT

An apparatus and a method are described, by which interference related detection results of a plurality of relay nodes are obtained, wherein each relay node to the radio access network, wherein a connection between the relay node and its serving access node is an access node—relay node connection. The relay nodes are grouped according to the obtained detection results such that the access node—relay node connection can be configured for each group in order to mitigate interference to mitigate interference between transmissions to and from different relay nodes in each group.

21 Claims, 6 Drawing Sheets

(56) References Cited

U.S. PATENT DOCUMENTS

| | | | |
|---|---|---|---|
| 7,756,482 B2* | 7/2010 | Lin et al. | 455/67.13 |
| 2007/0129008 A1* | 6/2007 | Shi et al. | 455/11.1 |
| 2008/0108305 A1* | 5/2008 | Lin et al. | 455/11.1 |
| 2008/0159217 A1* | 7/2008 | Chang et al. | 370/329 |
| 2009/0233544 A1* | 9/2009 | Oyman | H04B 7/15592 455/7 |
| 2009/0286465 A1* | 11/2009 | Lin et al. | 455/3.01 |
| 2009/0318103 A1* | 12/2009 | Feenaghty et al. | 455/226.3 |
| 2010/0254344 A1* | 10/2010 | Wei et al. | 370/330 |
| 2010/0261482 A1 | 10/2010 | Guey | 455/452.2 |
| 2011/0116480 A1* | 5/2011 | Li et al. | 370/332 |
| 2011/0249611 A1* | 10/2011 | Khandekar et al. | 370/315 |
| 2012/0147810 A1* | 6/2012 | Wang et al. | 370/315 |
| 2012/0250526 A1* | 10/2012 | Zhao | H04B 7/2606 370/243 |
| 2012/0309291 A1* | 12/2012 | Sawai | 455/7 |
| 2013/0337811 A1* | 12/2013 | Faerber et al. | 455/436 |

OTHER PUBLICATIONS

3GPP TSG-RAN WG2 Meeting #65bis, Seoul, Korea, Mar. 23-27, 2009, R2-092036, "Interface between relay peer-node in LTE-Advanced", Sharp, 3 pgs.

3GPP TSG-RAN WG2 Meeting #67, Shenzhen, China, Aug. 24-28, 2009, R2-095839, "Discussions on DL CoMP for LTE-A", Fujitsu 7 pgs.

3GPP TR 36.814 V9.0.0 (Mar. 2010), $3^{rd}$ Generation Partnership Projects Technical Specification Group Radio Access Network; Evolved Universal Terrestrial Radio Access (E-UTRA); Further advancements for E-UTRA physical layer aspect (Release 9), 104 pgs.

\* cited by examiner

Fig. 4A
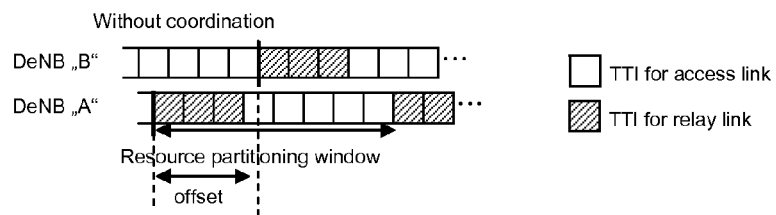
Fig. 4B
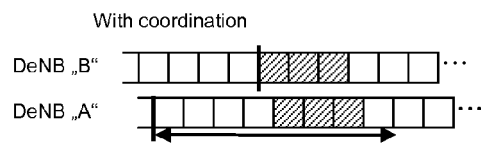
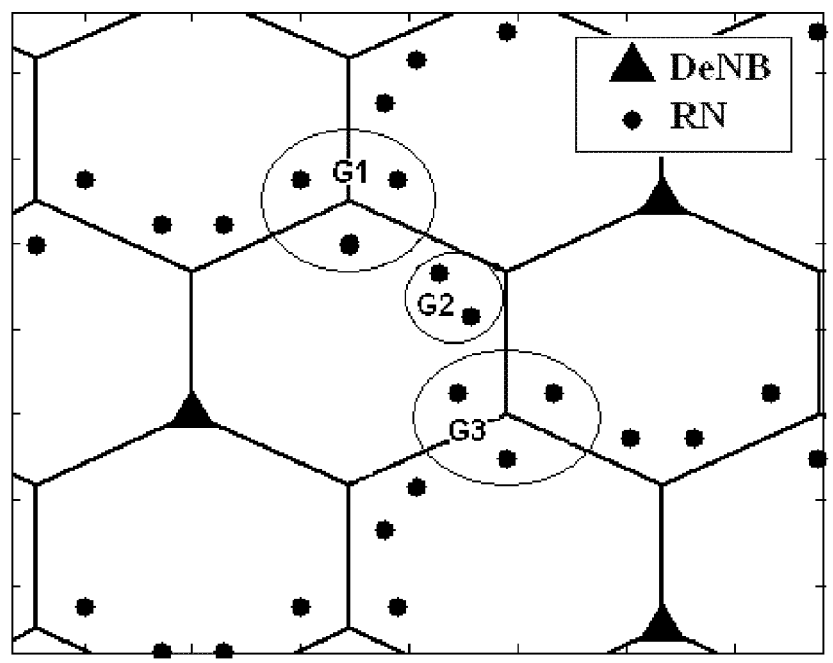
Fig. 5

DIVIDE-AND-CONQUER APPROACH TO MITIGATING RELAY-TO-RELAY INTERFERENCE

FIELD OF THE INVENTION

The present invention relates to apparatuses, methods and a computer program product for mitigating relay-to-relay interference by applying a divide-and-conquer approach.

RELATED BACKGROUND ART

The following meanings for the abbreviations used in this specification apply:
3GPP 3$^{rd}$ generation partnership project
DeNB Donor evolved Node B
DL Downlink
DSP Digital signal processor
ECGI E-UTRAN Cell Global Identifier
eNode-B evolved Node B (also referred to as eNB)
FDD Frequency-division duplex
ICIC Inter cell interference coordination
IM Interference management
IP Internet protocol
LOS Line of sight
LTE Long term evolution
LTE-A LTE-Advanced
MBSFN Multicast/broadcast single frequency network
OFDMA Orthogonal frequency-division multiple access
O&M Operation and Maintenance
NLOS Non line of sight
PCI Physical-layer cell identity
PRB Physical resource block
RAN Radio access network
RN Relay node
RPW Resource partitioning window
RSRP Reference signal received power
RSRQ reference signal received quality
SON Self organizing network
TDM Time-division multiplexing
TTI Transmission time interval
UE User equipment
UL Uplink
UMTS Universal mobile telecommunications system
VoIP Voice over IP Embodiments of the present invention relate to mobile radio communications with focus on LTE-A. In particular, embodiments of the invention target relaying as a feature of LTE-A. Relaying is a promising technology to extend cell coverage, in particular to provision high data rates in high shadowing environments (e.g. indoor coverage), and to enhance cell capacity with a low cost for LTE-A systems. FIG. 1 shows the typical LTE radio access scenario including relay nodes (RNs). There are basically three different links in such a deployment:
  direct link (the connection between a donor evolved Node B (DeNB) and user equipment (UE))
  backhaul link or relay link (connection between a DeNB and an RN) and
  access link (connection between an RN and a UE)

An interface between the DeNB and the RN is defined as Un interface, and an interface between the RN and the UE is defined as Uu interface, as the interface between eNB/DeNB and the UE.

There are many types of relays which might be applicable to different scenarios. Type 1 relay node (RN) is being specified during the work item in LTE Release 10 (as described, e.g., in TR 36.814 v9.0.0 (2010-03), Further Advancements for E-UTRA, Physical Layer Aspects). Type 1 relay is an in-band relay, which will use the same frequency band for relay link and access link, and which controls its own cell, and a unique physical-layer cell identity (PCI) is provided for each of the cells. The same RRM mechanisms and protocol stacks are available and from a UE perspective there is no difference between the cells controlled by a relay and the cells controlled by a "normal" eNB. Additionally, the cells controlled by the relay should also support LTE Release 8 UEs, because a mandatory backward compatibility is required. Moreover, for Type 1 relay, access link and relay link transmissions are time multiplexed, which means the relay cannot communicate with UEs it serves (RN-UEs) and DeNB simultaneously. There is a defined time frame consisting of several transmission time intervals (TTIs), referred in the following as resource partitioning window, where one subset of the TTIs is used for relay links (also referred to as Un sub-frame configuration) and the complementary part for the access links (FIG. 2). Note that in FIG. 2 the TTIs assigned for the relay links are shown to be consecutive as an example and that they can also be non-consecutive. All of the available resources can be used for the direct links, i.e. they share the resources with the relay links (the user scheduler at the DeNB decides to schedule relay or direct links on any particular physical resource block (PRB), i.e. smallest frequency-time resource element of the orthogonal frequency-division multiple access (OFDMA) system) and use the same resources as the access links using for instance interference coordination (ICIC) means.

Due to this time multiplexing feature of the relay link and access link for Type 1 relay, a new type of interference—which does not exist in the original system without relays—will be introduced by relays, namely relay-to-relay interference (RN-to-RN interference) among different relays. This kind of interference will exist for both the downlink (DL) and the uplink (UL), and mainly arises when the transmission of a relay fully or partially overlap the reception of another relay. In the following section, this interference problem in relay systems is illustrated in detail.

In relay deployments, a new type of interference may occur: the RN-to-RN interference. It does not exist in other heterogeneous networks like Femtocells, Pico eNB deployments, etc. and therefore, this type of interference and its impact have not been properly investigated yet; however, solutions to coordinate it are now becoming necessary.

FIG. 3 presents example scenarios where RN-to-RN interference is experienced. In UL (dashed lines), RN-to-RN interference occurs when RN "B"-to-eNB "B" communication interferes with the victim UE "A"-to-RN "A" communication producing an interfering signal. In case of no power control (UEs and RNs transmit at maximum available power) interfering signal could be even much higher than the wanted signal due to the difference in antenna gains, transmission powers, etc. between UE "A" and RN "B". This is mostly because RN "B" has typically a higher transmit power than the UE and also has an antenna with higher gain, and furthermore its antenna is at higher altitude and will therefore more likely have a line-of-sight (LOS) connection to the victim RN's antenna. On the other hand, RN-to-RN interference could get even worse if power control (e.g. LTE Release 8 compliant power control) is applied. Here, the worst case scenario occurs when the aggressor RN has non-line-of-sight (NLOS) connection to its DeNB (i.e. it is transmitting with higher power to cover the strong attenuation due to the NLOS link) and has a LOS link with the victim RN. Further, in DL (solid lines), RN-to-RN interference occurs when RN "A"-to-UE "A" communication interferes with the victim eNB "B"-to-RN "B" communication producing an interfering signal at the victim RN "B". Considering the close deployments of RNs and good propagation conditions on the inter-RN channel, such interference can be significant as compared to the received signal on the RN at the macrocell edge.

From what preceded, it is clear that RN-to-RN interference will significantly degrade the access and relay link qualities in UL and DL, respectively. This, for example, could be the case in the following example scenarios:

Neighbouring RNs may be controlled by different independent DeNBs which are using different resource partitioning (different set of TTIs for access and relay links), i.e. no coordination (particularly Un sub-frame coordination) among DeNBs. Thus, it may be the case that there are contemporary transmission on access link for one RN and the backhauling (i.e. transmission on relay link) on the neighbouring RN. FIGS. 4A and 4B presents an example of such a case, where different TTIs are utilized in different cells to serve the access and relay links. In particular, FIG. 4A shows the case without coordination.

Note that even if coordination exists, different loads in the cells might lead to different sub-frame configurations. This could even be the case within the same cell, where different RNs have different configurations to achieve better utilization of both relay and access link resources (e.g. needed for capacity enhancement in hotspots).

In case where DeNBs in the network are coordinated and apply the same resource partitioning, i.e. same set of TTIs are configured in both cells to serve the access or relay links, it might still be the case that RN-to-RN interference takes place. This is mainly due to the lack of inter-DeNB time synchronization in frequency division duplex (FDD) systems, which might create a time offset and hence results in a partial overlapping between relay link and access link transmissions in different cells. FIG. 4B presents a visualization of this scenario, i.e., the case with coordination.

Hence, there is an urge to tackle this problem.

SUMMARY OF THE INVENTION

Thus, embodiments of the present invention are aiming at addressing at least some of the above-mentioned issues and/or problems and drawbacks.

According to a first aspect of the present invention, interference related detection results of a plurality of relay nodes are obtained, wherein each relay node is capable of being wirelessly connected to a radio access network, is associated with an access node of the radio access network, and serves to connect at least one user equipment which is wirelessly connected via at least one relay node to the radio access network, wherein a connection between the relay node connection. The relay nodes are grouped according to the obtained detection results such that the access node—relay node connection can be configured for each group in order to mitigate interference between transmissions to and from different relay nodes in each group.

The grouping can be performed by a centralized network entity in a centralized manner or by access nodes in a decentralized manner, for example. Moreover, also a decision on configuration of the access node—relay node connection can be performed by a centralized network entity in a centralized manner or by access nodes in a decentralized manner, for example.

Thus, according to embodiments of the invention, the RN-to-RN interference on the UL and the DL is alleviated by grouping of RNs within groups of nodes having the same Un sub-frame configuration, thus, creating RN-to-RN interference-free groups.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 4A illustrates RN-to-RN Interference due to uncoordinated resource partitioning, and FIG. 4B illustrates RN-to-RN Interference due to coordinated resource partitioning in un-synchronized networks, such as FDD based networks, FIG. 5 shows an exemplified grouping of RNs according to an embodiment of the present invention.

DETAILED DESCRIPTION OF EMBODIMENTS

Figure 1:
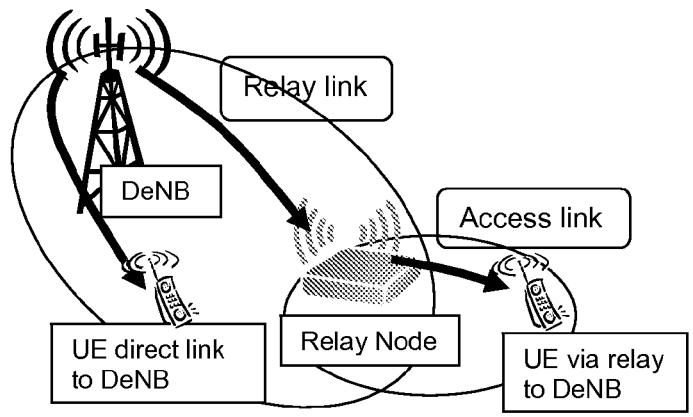
FIG. 1 shows an exemplarily LTE-A radio cellular deployment applying RN.
Figure 2:
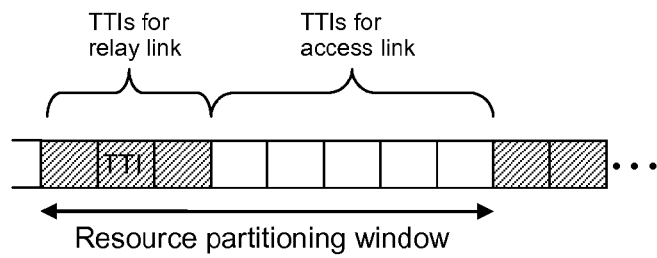
FIG. 2 illustrates an exemplified separation of access and relay links for UL and DL in time-division multiplexing (TDM) manner in frequency-division duplex (FDD) mode.

In the following, description will be made to embodiments of the present invention. It is to be understood, however, that the description is given by way of example only, and that the described embodiments are by no means to be understood as limiting the present invention thereto.

Embodiments of the present invention are in particular useful to be applied as optimization when different Un (or equivalently multicast/broadcast single frequency network—MBSFN) sub-frame configurations are necessary at the different RNs, within the same cell or in neighbouring cells, or to tackle overlapping access/relay link communications due to imperfect synchronization.

It may be possible to deal with RN-to-RN interference on a network-scale when assuming tight synchronization among different access nodes and system-wide Un sub-frame coordination. However, this does not allow optimizations according to the cell loads and traffic variations in a network. The RN-to-RN interference is a local problem which originates from RNs deployed in the close vicinity of each other and is thus confined to a small area i.e. to only such RN pairs that have a link with low attenuation between them e.g. due to LOS or due to specific antenna configurations. Therefore, there is no need to coordinate and align Un sub-frame configuration for all RNs in the network. Hence, according to embodiments of the present invention, a novel divide-and-conquer strategy is proposed where the problem of RN-to-RN interference is divided into many small local problems and then dealt with accordingly. On one hand, this offers a high flexibility in the network, and on the other hand it solves RN-to-RN interference in the area where it is really a problem; there might be many deployed RNs which do not suffer from RN-to-RN interference thanks to advantageous propagation conditions and hence there is no need to coordinate the Un sub-frame configuration for these RNs.

According to embodiments of the present invention, a 2-step scheme to mitigate RN-to-RN interference is proposed, namely RN grouping and coordination of Un sub-frame configurations. The former aims at identifying RNs which are causing severe RN-to-RN interference to each other and then group them into one group where then the latter, i.e. coordination of Un sub-frame configuration, is performed to mitigate RN-to-RN interference among the RNs within the same group. The two steps can be either performed in a distributed manner or via a centralized unit/scheme. Combinations of either are as well possible depending on the limitations on system complexity, overhead, delay, available communication links or central nodes, etc.

For the centralized approach, according to certain embodiments, a self organizing network (SON) entity e.g. located in the Operation and Maintenance (O&M) system can be applied (but it could also be implemented as an additional functionality in one of the DeNBs), referred to as IM entity, responsible for managing RN-to-RN interference in the system.

For the distributed approach, the DeNBs would initiate a hand-shake procedure among each other with ACK/NACK signaling.

The procedure for the different cases is as follows.

RN-to-RN interference measurements are carried out, and the measurement results or a summary is then provided from the RNs to the serving DeNBs in order to perform the grouping procedure and the Un sub-frame configuration as described below.

In a more general way, the DeNBs and/or RNs provide interference related detection results, which are detection results based on which interference can be estimated or determined. For example, the interference related detection results may comprise interference measurement results, interference estimation results and/or received power measurement or estimation results.

In order to identify the sources of significant interference in the network, i.e., to carry out interference measurements, the following approaches can be applied.

For example, additional measurements at RNs (RN might need to operate in UE mode to perform measurements) may be performed in order to generate interference reports. These reports are then transmitted over the X2 interface to the DeNB. The interference measurements can be carried out such that a first RN determines a power level of a second RN and determines the signal or channel quality. For example, the interference may be measured based on a reference signal or a data channel, which is configured in a measurement space configured by a DeNB or by the IM entity. The RN may use neighbouring cell measurement reference signal received power (RSRP) and reference signal received quality (RSRQ) within the configured measurement space.

Furthermore, it is possible that a victim RN estimates the RN-to-RN interference (for example in terms of path loss between the two RNs) by means of neighbouring cell measurements performed by the UEs in its coverage area. The victim RN can also provide information regarding the RN-to-RN interference per PRB and TTI procedures like used for Rel.8/9 Inter Cell Interference Coordination (ICIC) (or define new specific procedures). That is, for the measurement, UE neighbour cell signal strength measurements can be used.

The RN-to-RN estimation/measurements may then be forwarded to the DeNB.

Note that also other suitable interference measurement procedures can be applied.

The grouping procedure can be performed in a centralized or distributed manner.

Figure 3:
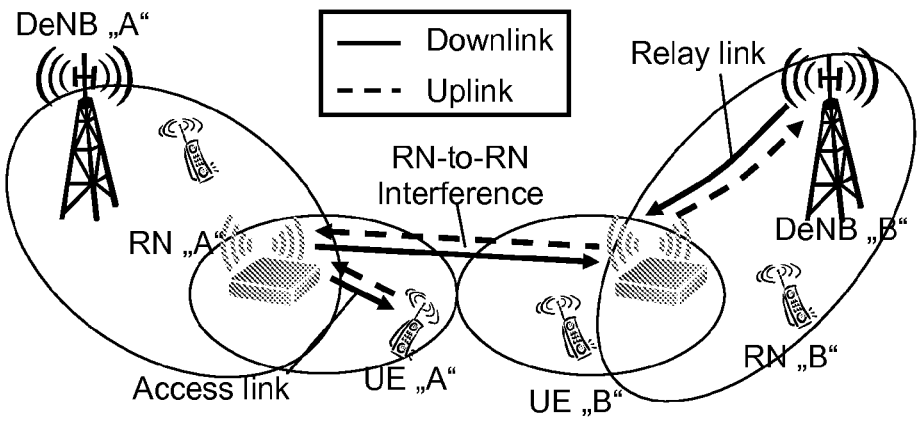
FIG. 3 illustrates RN-to-RN Interference in DL and UL communications.

In the following, the centralized grouping procedure is described first. The measurements are passed by the DeNBs to the IM SON entity in the O&M system which identifies the "main" RN-to-RN interference sources in the system for each RN, RN-to-RN interference scenarios in DL and UL have been described above in connection with FIG. 3, for example). Then, the IM SON entity groups the different RNs which impose threat to each other in virtual groups. A group may contain RNs served by the same DeNB or by different DeNBs.

FIG. 5 shows an exemplified grouping of RNs in a relay deployment with 4 RNs per cell. The RNs are marked as small circles; DeNBs, marked as triangles, serve 3-sector sites. In this example, three groups G1 to G3 are shown, wherein groups G1 and G3 each contains three RNs, and group G2 contains two RNs.

Furthermore, the IM SON entity informs the different DeNBs serving the RNs belonging to a certain group of the group creation/identification, group members (RNs) and their serving DeNBs (each other). An example would be to inform only the E-UTRAN Cell Global Identifier (ECGI) of each RN in the group because according to the relay architecture, the eNB ID of the RN is the same as that of its serving DeNB.

Figure 6A:
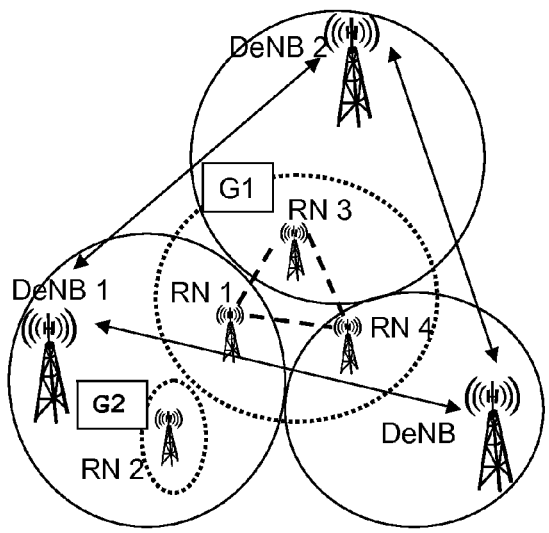
FIGS. 6A and 6B show a centralized grouping and Un sub-frame configuration procedure according to an embodiment of the present invention.
Figure 6B:
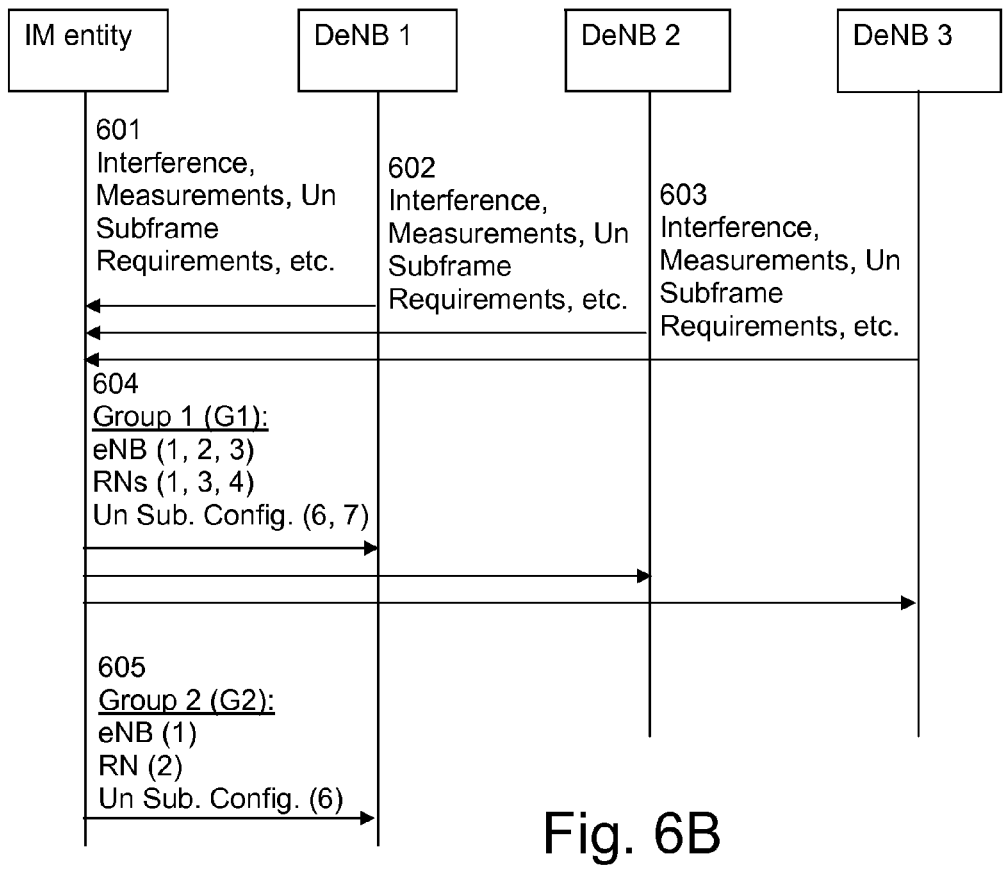

FIGS. 6A and 6B show an example procedure of centralized grouping (along centralized Un sub-frame configuration coordination which will be explained in what follows).

FIG. 6A shows an example comprising three DeNBs, DeNB 1, DeNB 2 and DeNB3, and four relay nodes, RN 1, RN 2, RN 3 and RN 4. In FIG. 6A, severe interference between the RNs is indicated by dashed lines. As illustrated, in this example interference occurs between RN 1, RN 3 and RN 4. The two groups to be formed are indicated by dotted circles.

FIG. 6B shows the example procedure for centralized grouping, including Un sub-frame configuration. In steps 601, 602 and 603, DeNB 1, DeNB 2 and DeNB 3 send respectively their measurement results and Un sub-frame requirements etc. to the IM entity. The IM entity groups the RNs based on the measurements, and also sets the Un sub-frame configuration. In particular, the IM entity forms two groups, namely group G1 containing RN 1, RN 3 and RN4, and group G2 containing RN 2. In steps 604 and 605, the IM entity informs the involved DeNBs correspondingly. That is, in step 604 it informs the DeNBs involved in the first group G1 (i.e., all DeNBs 1 to 3) about group G1, namely that RN 1, RN 3 and RN 4 belong to this group, and also informs about the decided Un sub-frame configuration, namely that slots 6 and 7 of the resource partitioning window (RPW) are to be used for RNs 1, 3 and 4. In step 605 the IM entity informs DeNB 1 involved in the second group G2 about group G2, namely that RN 2 belongs to this group, and also informs about the decided Un sub-frame configuration, namely that sub-frame 6 of the RPW is to be used. Note that steps 604 and 605 can be combined for the DeNB1, i.e. DeNB 1 will be informed in one step that RN 1 is part of group 1 and sub-frames 6 and 7 are to be configured as Un sub-frames, and that RN 2 belongs to group 2 and the Un sub-frame is the $6^{th}$ sub-frame. The DeNBs need not be aware of the grouping or sub-frame configuration at other DeNBs in the network, since IM entity takes care of RN-to-RN interference.

Additionally, in case a DeNB needs to reconfigure sub-frames for an RN, it has to inform the IM entity about the required change and the IM entity then proceeds to re-configure (and inform affected nodes), if needed, the Un sub-frame configuration for the different RNs in the group. This, for example, happens when the loads of the RN cells change, e.g. if the load increases the current Un sub-frame configured might not be enough and more sub-frames need to be assigned for the relay link.

In the following, a distributed grouping approach is described. As mentioned above, in the distributed grouping approach, the DeNBs involved negotiate the forming of the groups. In particular, each DeNB identifies the RNs (aggressors) which severely interfere its RNs (victims) based on the RN-to-RN interference measurements reported by the RNs or it can be simply informed about the interferers from the RNs.

Furthermore, the DeNB sends to the neighbor DeNBs with aggressor RNs a signal requesting to group the RNs within one group and awaits an ACK indicating an acceptance of grouping or a NACK along with another suggested viable grouping.

In case the DeNB receives a NACK from a neighbor DeNB, the DeNB sends the new received grouping to the different DeNBs serving the RNs within a possible group.

Note that the Un sub-frame requirements for each RN may be appended to the messages exchanged among the DeNBs.

Figure 7A:
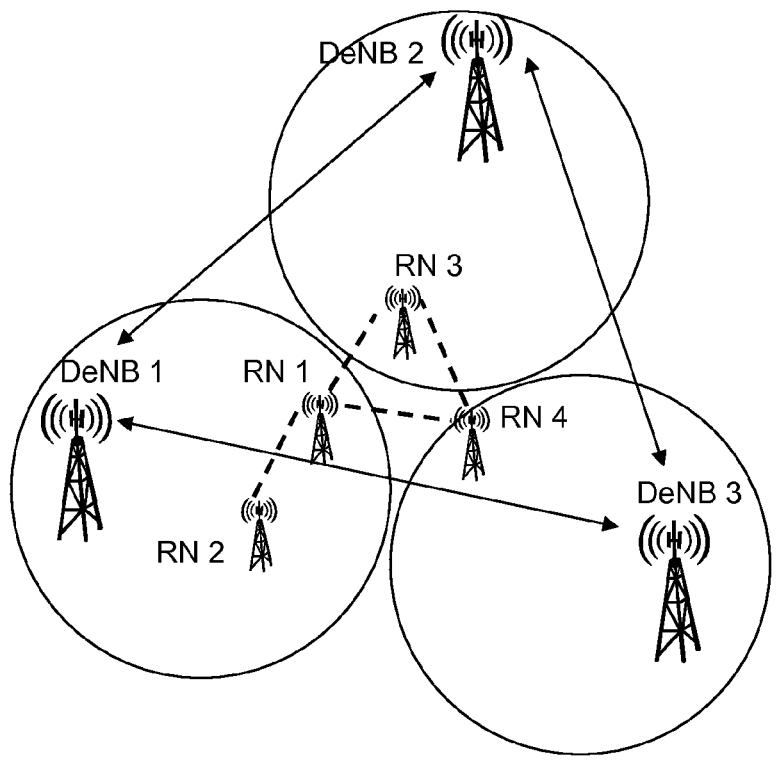
FIGS. 7A and 7B show a distributed grouping procedure according to an embodiment of the present invention.
Figure 7B:
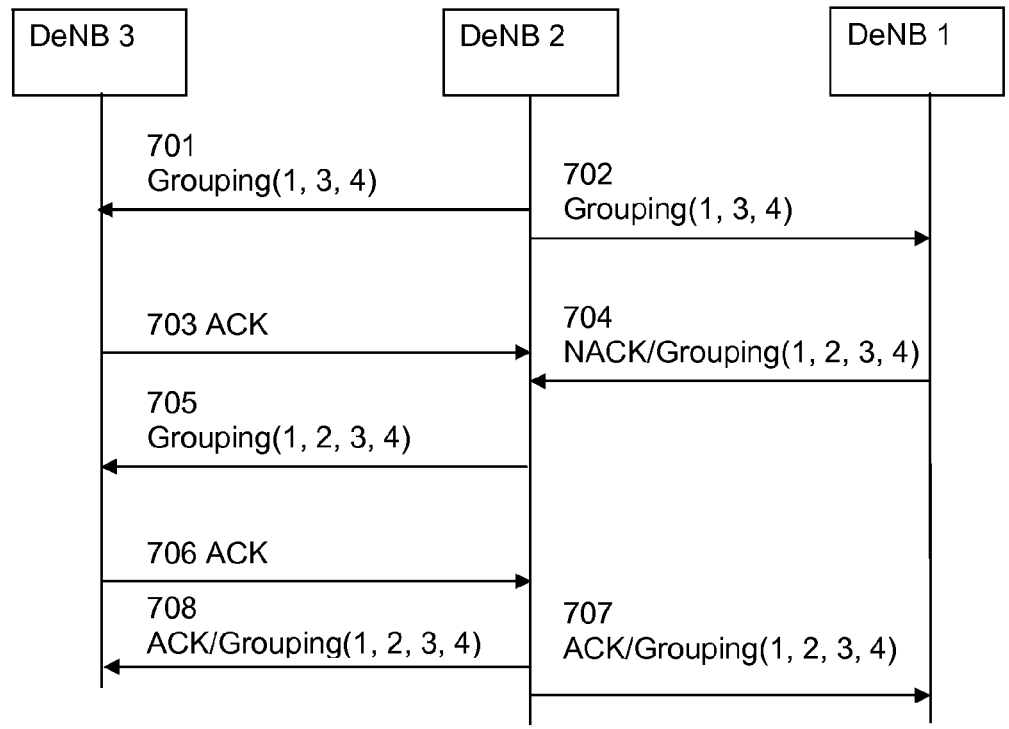

FIGS. 7A and 7B show an example procedure for a distributed grouping procedure.

FIG. 7A shows, similar as FIG. 6A, an example comprising three DeNBs, DeNB 1, DeNB 2 and DeNB3, and four RNs, RN 1, RN 2, RN 3 and RN 4. Interference between the RNs is indicated by dashed lines. As illustrated, in this example severe interference occurs between RN 1, RN 3 and RN 4, and also between RN 1 and RN 2.

In the procedure shown in FIG. 7B, it is assumed that DeNB 2 starts the grouping procedure. In step 701, it sends a message suggesting grouping of RNs RN 1, RN 3 and RN 4, to DeNB 3, and in step 702, it sends the same message to DeNB 1. In step 703, DeNB 3 agrees to the suggested grouping and sends an ACK accordingly. DeNB 1 does not agree with the suggested grouping, and sends in step 704 a NACK including a new proposal for a grouping, namely including all RNs RN 1 to RN 4 to DeNB 2. In response to this, DeNB 2 sends this new suggestion for grouping to DeNB 3 in step 705. DeNB 3 agrees with sending an ACK in step 706. In response to this, DeNB 2 sends an ACK to DeNB 1, including a confirmation of the group agreed on (i.e., containing RN 1, RN 2, RN 3 and RN 4) in step 707 and another confirmation to DeNB 3 in step 708. Another alternative approach to confirmation message exchange is that a DeNB can activate the grouping/configuration after a pre-defined timeout has expired, to be sure that other DeNBs do not propose a different grouping/configuration.

The procedure above is described for a case when it is initiated by a DeNB that identifies the aggressor RNs for its connected RNs but it can be started also by a DeNB that recognizes that its connected RNs are aggressors to neighboring RNs.

Subsequently, the Un sub-frame configuration can be performed in a centralized or distributed manner within each group.

In the following, the centralized Un sub-frame configuration is described. In this approach, the IM entity, having a view of the grouping and RN-to-RN interference in the system (as described above in connection with FIGS. 6A and 6B), asks possibly DeNBs and RNs within each group for extra information concerning the different cell loads, etc., or requirements of how many sub-frames are to be configured per RN (unless such info is already available). Then, the IM entity creates Un sub-frame configuration for the different groups according to the received information and the above requirements. Thereafter, the IM entity informs the DeNBs of the different configurations of the group(s) their RNs belong to. In case there is no need for the group members to be aware of each other, since the RN-to-RN interference problem is handled at the IM entity, the message in 604 could be confined to contain only the sub-frame configuration. The DeNBs are then responsible for the configuration procedure.

It is noted that in the example of FIG. 6B, grouping and configuration is performed at the same time in a centralized manner. However, it is also possible that first a centralized grouping is performed, and after that the Un sub-frame configuration is decided on (or performed) in a distributed manner. Moreover, it is also possible to perform grouping in a decentralized manner (as described above in connection with FIGS. 7A and 7B), and to decide on the Un sub-frame configuration in a centralized manner afterwards.

Next, the distributed Un sub-frame configuration is described. In this approach, the DeNBs serving a group initiate a hand-shake procedure to agree on a Un sub-frame configuration which suits their requirements and cell conditions/loads. An example procedure is described in the following by referring to FIG. 8.

A DeNB with RN(s) in a certain group sends other DeNBs with aggressor RNs in the same group a message informing them about one or a set of possible Un sub-frame configurations and waits for ACKs. If the proposed Un sub-frame configuration is acceptable (or a subset of Un sub-frames if DeNB proposes a set with higher number of possible sub-frames than what it needs), other DeNBs reply with ACK (including feasible Un sub-frame subset) and a feasible configuration is thus agreed on. Otherwise, the other DeNBs suggest possible configurations and all the DeNBs in the group could agree on and be shared within.

If still no agreement was reached, the DeNBs could try either "releasing" the conflicting sub-frame(s) to allow for more flexible relay link configuration or reconfiguring other RNs they are connected (these are the RNs for which a Un sub-frame configuration has been agreed or that are not included in any group) and proceed to agree on a new set of possible configurations by repeating the handshake.

If an agreement is reached on a configuration, the DeNBs then configure their RNs. Further, an upper limit on the number of hand-shakes can be defined in order to insure the convergence of the procedure, although it may come at a sub-optimal performance.

In case of centralized grouping, DeNBs should inform the IM entity of the configuration agreed on.

Figure 8A:
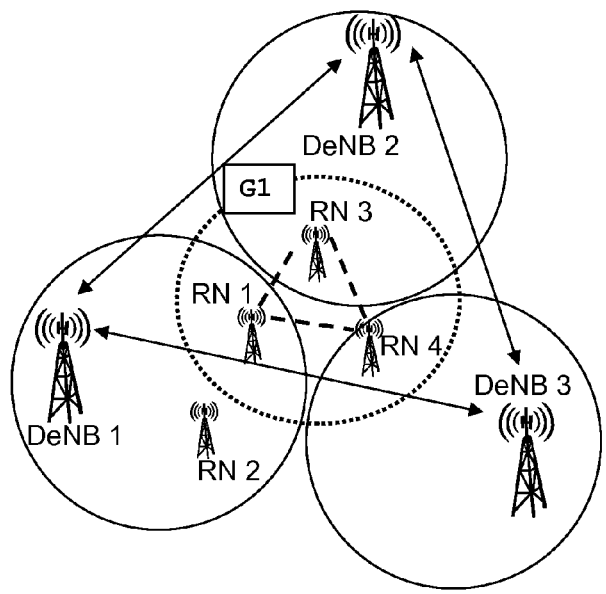
FIGS. 8A and 8B show a distributed Un sub-frame configuration procedure according to an embodiment of the present invention.
Figure 8B:
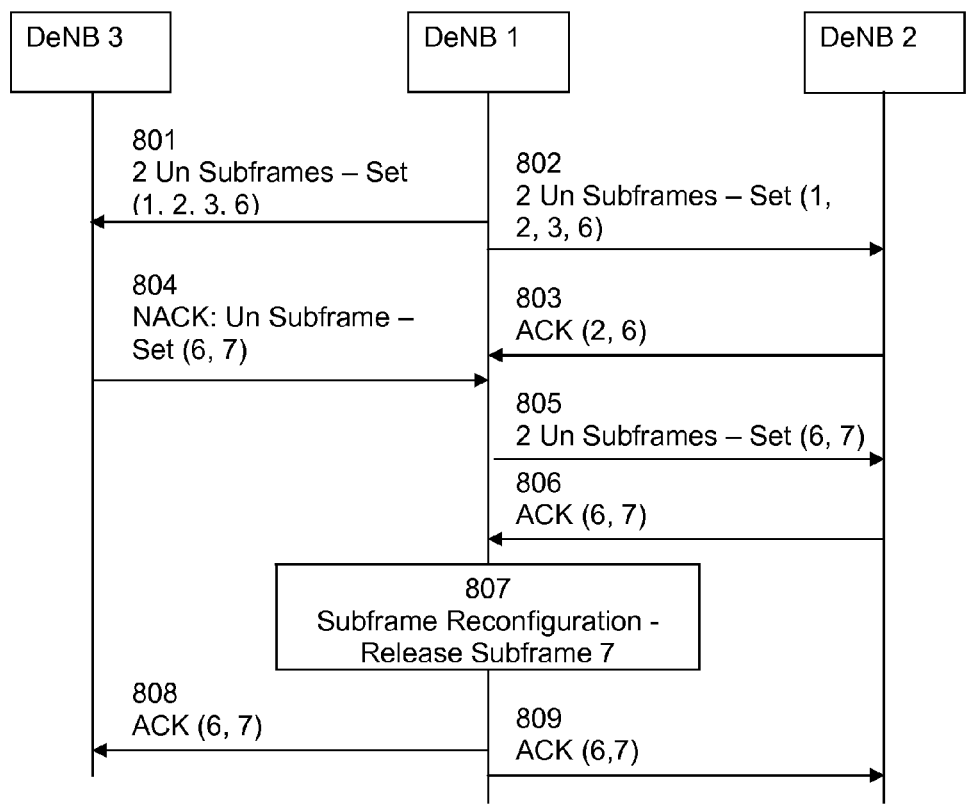

FIGS. 8A and 8B show an example procedure for a distributed Un sub-frame configuration.

FIG. 8A shows, similar to FIGS. 6A and 7A, an example comprising three DeNBs, DeNB 1, DeNB 2 and DeNB3, and four relay nodes, RN 1, RN 2, RN 3 and RN 4. Interference between the RNs is indicated by dashed lines.

As illustrated, in this example severe interference occurs between RN 1, RN 3 and RN 4.

In the procedure shown in FIG. 8B, it is assumed that DeNB 1 starts the configuration procedure. In step 801, DeNB 1 sends a message to DeNB 3, in which it is proposed to use two Un sub-frames out of a set which comprises sub-frames 1, 2, 3 and 6. The same message is sent to DeNB 2. In this example, it is assumed that DeNB 2 agrees. Thus, it sends an ACK in step 803, in which also the sub-frames to be used are indicated, namely 2 and 6. However, DeNB 3 does not agree and sends a NACK in step 804 to DeNB 1, in which also a new Un sub-frame set is proposed, namely sub-frames 6 and 7. In response to this, DeNB 1 sends a new message to DeNB 2 in step 805, in which the newly suggested Un sub-frame configuration is included, namely sub-frames 6 and 7. It is still indicated that two sub-frames are to be used. DeNB 2 agrees and sends an ACK to DeNB 1 in step 806. Let's assume that sub-frame 7 is used for the relay link of RN2, but any other sub-frame would be fine for the relay link of RN2 because it does not belong to any group. In step 807, DeNB 1 performs a sub-frame reconfiguration. Since both DeNB 3 and DeNB 2 agreed about using sub-frame 7 as well, DeNB 1 changes the configuration such that it releases sub-frame 7 basically reconfiguring the relay link of RN for example on sub-frame 1. That is, DeNB 1 enables that sub-frame 7 is allowed to be used. After this, DeNB 1 sends an ACK in step 808 to DeNB 3 and in step 809 to DeNB 2, in which the use of sub-frames 6 and 7 is acknowledged.

Thus, the new configuration can be used.

Note that the group ID (or RN IDs or any other way to identify the RNs within a group) is part of the exchanged messages (although not explicitly shown in the example procedure).

It is possible that in an existing group with an already established Un sub-frame configuration, a new RN may join a group. This can be caused by a newly deployed RN, or simply by changes in the channel conditions for some reason.

In case of centralized grouping, this is again handled by the IM entity. The IM entity informs the DeNB serving the new RN of the group the RN is part of and the already agreed configuration for that group. As well, the IM entity may update the group information available/known at the different eNBs and RNs corresponding to the group in case the addition of a new RN requires for example a new Un sub-frame configuration.

In case of distributed schemes, the DeNB is aware of the current grouping and configuration, and if needed, a new handshake procedure as described above will be initiated to handle any disagreement on grouping or Un sub-frame configuration.

It is noted that also a fuzzy membership of an RN to a group is possible. That is, an RN could belong to some degree to one group and to some degree to another group (in the example of FIG. 7A, this could be the case for RN 1, when grouping RN 1, RN 3 and RN 4 as a first group, and RN 1 and RN 2 as a second group). In such a case, overlapping configuration could be used between the two different groups, where RNs belonging to two groups could be scheduled on the overlapping Un sub-frames, or conservatively, RNs would have Un sub-frame configuration covering both configurations of both groups.

For the centralized approach, the exchange of the information can be done via the interface between DeNBs and the O&M, if the IM is located in the O&M or via the X2 interface if the IM is located in one of the DeNBs. For the distributed approach, the X2 interface can be used to exchange information among DeNBs.

Note that depending on, e.g. channel conditions, whether a power control scheme is applied on UL or not, transmit power levels, and UE channel conditions, different grouping decisions could be taken for UL and DL. Moreover, in case that the same groupings should be used for both UL and DL (e.g. when the Un sub-frame configuration for UL is implicitly determined according to the DL Un sub-frame configuration), a common grouping scheme could be decided depending on some preferences such as UL and DL traffic.

Furthermore, the distributed grouping and Un sub-frame configuration described above are initiated by the DeNB, but can as well be initiated by the RNs and in this case it is not needed to provide the RN-to-RN interference measurements/estimations from the RNs to their serving DeNBs. However, the DeNB based solution may be preferred, because, depending on the network specifications, it might be easier to agree on a specific grouping and/or Un sub-frame coordination if the coordination is done at the DeNB level instead of RN level as the DeNB already supervises several RNs.

Moreover, according to the embodiments described above, the IM entity or the access node decides on a configuration. However, the configuration can also actually be performed by these elements. In addition, the configuration can also be performed by some external entity.

Figure 9:
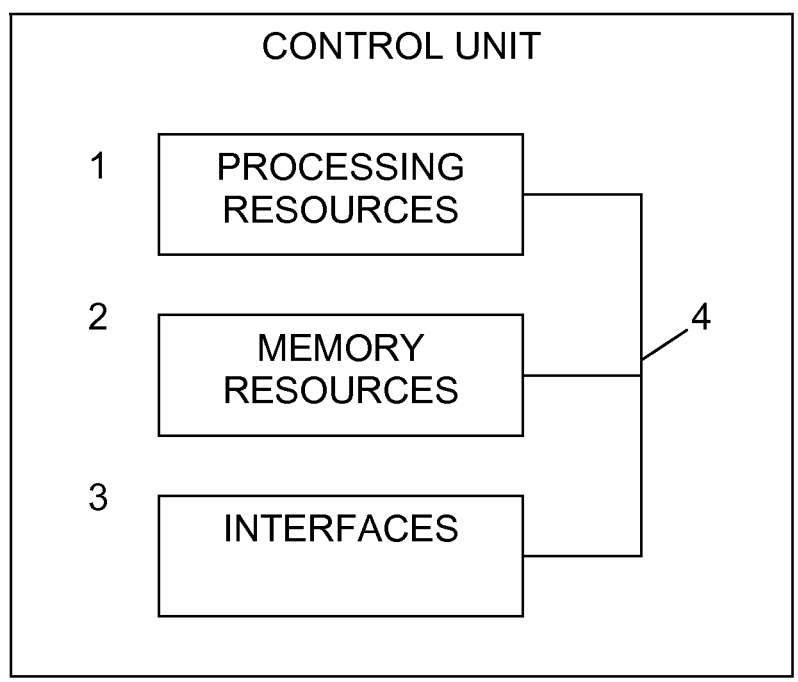
FIG. 9 shows an example for a control unit applied to an access node, an RN or an interference management (IM) entity according to an embodiment of the present invention.

FIG. 9 illustrates a simplified block diagram of a control unit 10 that may be used in the above-described access nodes, RNs and the IM entity, for practicing the exemplary embodiments of the invention.

The control unit 10 includes processing resources 1, memory resources 2 that may store a program, and interfaces 3 which may include a suitable radio frequency transceiver coupled to one or more antennas for bidirectional wireless communications over one or more wireless links. The processing resource 1, the memory resources 1 and interfaces 1 may be coupled by a bus 4.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Programs stored by the memory resources 2 are assumed to include program instructions that, when executed by the associated processing resources 1, enable the control unit used in the access nodes, RNs and IM entity, respectively, to operate in accordance with the exemplary embodiments and aspects of this invention. Inherent in the processing resources 1 is a clock to enable synchronism among the various apparatus for transmissions and receptions within the appropriate time intervals and slots required, as the scheduling grants and the granted resources/sub-frames are time dependent. The transceivers of the interfaces 3 include both transmitter and receiver, and inherent in each is a modulator/demodulator commonly known as a modem. The interfaces 3 may also include a modem to facilitate communication over (hardwire) links.

In general, the exemplary embodiments of this invention may be implemented by computer software stored in the memory resources 2 and executable by the processing resources 1, or by hardware, or by a combination of software and/or firmware and hardware in any or all of the devices shown.

The memory resources 2 may be of any type suitable to the local technical environment and may be implemented using any suitable data storage technology, such as semiconductor-based memory devices, magnetic memory devices and systems, optical memory devices and systems, fixed memory and removable memory. The processing resources 1 may be of any type suitable to the local technical environment, and may include one or more of general purpose computers, special purpose computers, microprocessors, digital signal processors (DSPs) and processors based on a multi-core processor architecture, as non-limiting examples.

For example, the control unit can be located in the IM entity in the O&M in case of the centralized approach, or can be located in the DeNBs or in the RNs in the distributed approach. The IM entity can also be located in one of the DeNBs. The control unit with its processing resources 1, memory resources 2 and interfaces 3 may be used to implement the functionality of the respective access node, relay node or IM entity as described above. For example, when the control unit is applied in DeNB 1 the processing resources 1 may execute the procedures shown in FIGS. 7B and 8B using the memory resources 2 e.g. for reading out processing instructions corresponding to the steps, caching and storing processing results, and the interfaces 3 e.g. for receiving/transmitting the messages from/to the access nodes DeNB 2 and DeNB 3. In DeNB 2 and DeNB 3, the control unit can be applied in order to carry out the corresponding functions. Alternatively or in addition, the steps may be implemented by hardware in the processing resources 1, as mentioned above.

Hence, according to embodiments of the present invention, a 2-step scheme to mitigate RN-to-RN interference is established, namely RN grouping and coordination of Un sub-frame configurations, wherein both steps can be performed in a centralized manner or in a decentralized manner. Thus, RN-to-RN interference can be mitigated locally, namely with the corresponding groups.

The invention is not limited to the specific embodiments and examples described above.

In particular, in the above embodiments it was described that the configuration of the connection between a relay node (RN) and its serving access node (which is also referred to as access node—relay node connection) refers to a configuration of the Un sub-frames. However, alternatively or in addition also other suitable configuration parameter can be set for each group.

Moreover, the embodiments were described by referring to LTE-A. However, this is only an example, and the embodiments can be applied to any scheme in which a similar interference scenario is to be mitigated.

According to a first aspect of general embodiments of the present invention, an apparatus is provided comprising
  a control unit configured
    to obtain interference related detection results of a plurality of relay nodes, wherein each relay node is capable of being wirelessly connected to a radio access network, is associated with an access node of the radio access network, and serves to connect at least one user equipment which is wirelessly connected via the at least one relay node to the radio access network, wherein a connection between the relay node and its serving access node is an access node—relay node connection, and
    to group the relay nodes according to the obtained interference related detection results such that the access node—relay node connection can be configured for each group in order to mitigate interference between transmissions to and from different relay nodes in each group.

The first and the second aspect may be modified as follows:

The control unit may be configured to group the relay nodes also based on connection requirements for the access node—relay node connection.

The apparatus may be a network management entity or may be a part of a network management entity. For example, but not limited thereto, the apparatus may be the IM entity shown in FIG. 6B.

The control unit may be configured to inform the access nodes and the relay nodes about the group.

The apparatus may be the access node or may be a part of the access node, or may be one of the relay nodes or a part of one of the relay nodes.

The control unit may be configured to identify relay nodes causing interference to other relay nodes based on the obtained interference related detection results, and to inform a neighbour access node serving a relay node causing interference to group the relay nodes within one group.

The control unit may be configured to negotiate with one or more neighbour access nodes or one or more relay nodes in order to form at least one group.

The control unit may be configured to decide on a configuration of the access node—relay node connection for each group in order to mitigate interference between transmissions to and from different relay nodes in each group.

The control unit may be configured to obtain information regarding the condition of the access node—relay node connections, to decide on a configuration of the access node—relay node connections for each group according to the obtained information, and to inform the access nodes about the configuration for each relay node.

The control unit may be configured to negotiate configuration of the access node—relay node connections with at least one neighbour access node serving relay nodes of a same group or with the relay nodes of the same group.

According to a second aspect of general embodiments of the present invention, an apparatus is provided comprising
  a control unit configured
    to negotiate configuration of access node—relay node connections with one or more neighbour access node serving relay nodes of a same group or with the relay nodes of the same group,
  wherein the relay node is capable of being wirelessly connected to a radio access network and serves to connect at least one user equipment which is wirelessly connected via the at least one relay node to the radio access network, and the access node—relay node connection is a connection between the relay node and its serving access node.

The first and the second aspects may be modified as follows:

The control unit may be configured to send a configuration proposal message including a proposed configuration to a neighbour access node with a relay node in the same group or to a relay node in the same group, to receive a response message in response to the configuration proposal message including confirmation of the proposed configuration or a new proposed configuration, and to decide on a configuration based on the response message.

The control unit may be configured to send a confirmation of a decision on a configuration in response to a confirmation message of a configuration.

The control unit may be configured to receive a configuration proposal message including a proposal for a configuration from the neighbour access node or relay node belonging to a same group, to decide whether the proposed configuration is acceptable or not, and to send a response message in response to the configuration proposal message including confirmation of the proposed configuration or a new proposed configuration based on the result of the decision.

According to a third aspect of general embodiments of the present invention, an apparatus is provided comprising
  a control unit configured
    to provide interference related detection results of at least one relay node associated with the apparatus, wherein the relay node is capable of being wirelessly connected to a radio access network and serves to connect at least one user equipment which is wirelessly connected via the at least one relay node to the radio access network,
    to send the interference related detection results to a network management entity for grouping the relay nodes according to the obtained detection results, and
    to receive information about the group to which the apparatus and the at least one relay node belong.

According to a fourth aspect of general embodiments of the present invention, an apparatus is provided comprising
  a control unit configured
    to provide interference related detection results of at least one relay node associated with the apparatus, wherein the relay node is capable of being wirelessly connected to a radio access network and serves to connect at least one user equipment which is wirelessly connected via the at least one relay node to the radio access network,
    to receive a request from a neighbour access node to group the relay nodes within at least one group,
    to decide whether the proposed grouping is acceptable or not, and
    to send a response message in response to the grouping proposal including confirmation of the proposed grouping or a new proposed grouping based on result of the decision.

According to a modification of the fourth aspect, the control unit may be configured to negotiate with one or more neighbour access nodes or one or more relay nodes in order to form at least one group.

According to a modification of the first to fourth aspects, the interference related detection results may comprise interference measurement results, interference estimation results and/or received power measurement or estimation results.

According to a fourth aspect of general embodiments of the present invention, an apparatus is provided comprising
  a control unit configured
    to receive a configuration message including a configuration for a connection between an access node and a relay node belonging to a same group,
    wherein the apparatus is the access node or a part thereof, and the relay node is capable of being wirelessly connected to a radio access network and serves to connect at least one user equipment which is wirelessly connected via the at least one relay node to the radio access network.

According to a sixth aspect of general embodiments of the present invention, a method is provided comprising obtaining interference related detection results of a plurality of relay nodes, wherein each relay node is capable of being wirelessly connected to a radio access network, is associated with an access node of the radio access network, and serves to connect at least one user equipment which is wirelessly connected via the at least one relay node to the radio access network, wherein a connection between the relay node and its serving access node is an access node—relay node connection, and
  grouping the relay nodes according to the obtained interference related detection results such that the access node—relay node connection can be configured for each group in order to mitigate interference between transmissions to and from different relay nodes in each group.

The sixth aspect may be modified as follows:

The method may further comprise grouping the relay nodes also based on connection requirements for the access node—relay node connection.

The method may be carried out by a network management entity or a part thereof.

The method may further comprise informing the access nodes and the relay nodes about the group.

The method may be carried out by the access node or a part of the access node, or may be carried out by one of the relay nodes or a part of one of the relay nodes.

The method may further comprise identifying relay nodes causing interference to other relay nodes based on the obtained interference related detection results, and informing a neighbour access node serving a relay node causing interference to group the relay nodes within one group.

The method may further comprise negotiating with one or more neighbour access nodes or one or more relay nodes in order to form at least one group.

The method may further comprise deciding on a configuration of the access node—relay node connection for each group in order to mitigate interference between transmissions to and from different relay nodes in each group.

The method may further comprise obtaining information regarding the condition of the access node—relay node connections, deciding on a configuration of the access node—relay node connections for each group according to the obtained information, and informing the access nodes about the configuration for each relay node.

The method may further comprise negotiating configuration of the access node—relay node connections with at least one neighbour access node serving relay nodes of a same group or with the relay nodes of the same group.

According to a seventh aspect of general embodiments of the present invention, a method is provided comprising
  negotiating configuration of access node—relay node connections with one or more neighbour access node serving relay nodes of a same group or with the relay nodes of the same group,
  wherein the relay node is capable of being wirelessly connected to a radio access network and serves to connect at least one user equipment which is wirelessly connected via the at least one relay node to the radio access network, and the access node—relay node connection is a connection between the relay node and its serving access node.

According to a seventh aspect of general embodiments of the present invention, a method is provided comprising sending a configuration proposal message including a proposed configuration to a neighbour access node with a relay node in the same group or to a relay node in the same group, receiving a response message in response to the configuration proposal message including confirmation of the proposed configuration or a new proposed configuration, and deciding on a configuration based on the response message.

According to a modification of the seventh aspect the method may further comprise sending a confirmation of a decision on a configuration in response to a confirmation message of a configuration.

The sixth and the seventh aspect may be modified such that the method may further comprise receiving a configuration proposal message including a proposal for a configuration from the neighbour access node or relay node belonging to a same group, deciding whether the proposed configuration is acceptable or not, and sending a response message in response to the configuration proposal message including confirmation of the proposed configuration or a new proposed configuration based on the result of the decision.

According to a eighth aspect of general embodiments of the present invention, a method is provided comprising providing interference related detection results of at least one relay node associated with an access node, wherein the relay node is capable of being wirelessly connected to a radio access network and serves to connect at least one user equipment which is wirelessly connected via the at least one relay node to the radio access network, sending the interference related detection results to an network management entity for grouping the relay nodes according to the obtained detection results, and receiving information about the group to which the access node and the at least one relay node belong.

According to a ninth aspect of general embodiments of the present invention, a method is provided comprising providing interference related detection results of at least one relay node associated with an access node, wherein the relay node is capable of being wirelessly connected to a radio access network and serves to connect at least one user equipment which is wirelessly connected via the at least one relay node to the radio access network, receiving a request from a neighbour access node to group the relay nodes within at least one group, deciding whether the proposed grouping is acceptable or not, and sending a response message in response to the grouping proposal including confirmation of the proposed grouping or a new proposed grouping based on result of the decision.

According to a modification of the ninth aspect the method may further comprise negotiating with one or more neighbour access nodes or one or more relay nodes in order to form at least one group.

According to a modification of the sixth to ninth aspects, the interference related detection results may comprise interference measurement results, interference estimation results and/or received power measurement or estimation results.

According to a tenth aspect of general embodiments of the present invention, a method is provided comprising receiving a configuration message including a configuration for a connection between an access node and a relay node belonging to a same group, wherein the method is carried out by the access node or a part thereof, and the relay node is capable of being wirelessly connected to a radio access network and serves to connect at least one user equipment which is wirelessly connected via the at least one relay node to the radio access network.

According to an eleventh aspect of several embodiments of the present invention, a computer program product is provided which comprises code means for performing a method according to any one of the first to third aspects and their modifications when run on a processing means or module.

The computer program product may comprise a computer-readable medium on which the software code portions are stored, and/or wherein the program is directly loadable into a memory of the processor.

According to a twelfth aspect of several embodiments of the invention, an apparatus is provided which comprises means for obtaining interference related detection results of a plurality of relay nodes, wherein each relay node is capable of being wirelessly connected to a radio access network, is associated with an access node of the radio access network, and serves to connect at least one user equipment which is wirelessly connected via the at least one relay node to the radio access network, wherein a connection between the relay node and its serving access node is an access node—relay node connection, and means for grouping the relay nodes according to the obtained interference related detection results such that the access node—relay node connection can be configured for each group in order to mitigate interference between transmissions to and from different relay nodes in each group.

According to a thirteenth aspect of several embodiments of the invention, an apparatus is provided which comprises sending a configuration proposal message including a proposed configuration to a neighbour access node with a relay node in the same group or to a relay node in the same group, receiving a response message in response to the configuration proposal message including confirmation of the proposed configuration or a new proposed configuration, and deciding on a configuration based on the response message.

According to a fourteenth aspect of general embodiments of the present invention, an apparatus is provided comprising means for providing interference related detection results of at least one relay node associated with an access node, wherein the relay node is capable of being wirelessly connected to a radio access network and serves to connect at least one user equipment which is wirelessly connected via the at least one relay node to the radio access network, means for sending the interference related detection results to an network management entity for grouping the relay nodes according to the obtained detection results, and means for receiving information about the group to which the access node and the at least one relay node belong.

According to a fifteenth aspect of general embodiments of the present invention, an apparatus is provided comprising means for providing interference related detection results of at least one relay node associated with an access node, wherein the relay node is capable of being wirelessly connected to a radio access network and serves to connect at least one user equipment which is wirelessly connected via the at least one relay node to the radio access network, means for receiving a request from a neighbour access node to group the relay nodes within at least one group, means for deciding whether the proposed grouping is acceptable or not, and means for sending a response message in response to the grouping proposal including confirmation of the proposed grouping or a new proposed grouping based on result of the decision.

According to a sixteenth aspect of general embodiments of the present invention, an apparatus is provided comprising means for receiving a configuration message including a configuration for a connection between an access node and a relay node belonging to a same group, wherein the apparatus is the access node or a part thereof, and the relay node is capable of being wirelessly connected to a radio access network and serves to connect at least one user equipment which is wirelessly connected via the at least one relay node to the radio access network.

It is to be understood that any of the above modifications can be applied singly or in combination to the respective aspects and/or embodiments to which they refer, unless they are explicitly stated as excluding alternatives.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
   at least one processor; and
   at least one memory including computer program code,
   the at least one memory and the computer program code configured to, with the at least one processor, cause the apparatus to perform at least the following:
   obtain interference related detection results of interference occurring at least between a plurality of relay nodes, wherein each relay node of the plurality of relay nodes is capable of being wirelessly connected to a radio access network, is associated with an access node of the radio access network, and serves to connect at least one user equipment which is wirelessly connected to the radio access network, wherein a connection between the relay node and its serving access node is an access node—relay node connection;
   negotiate at least one of a grouping and a subframe configuration with one or more neighbour access nodes;
   group the relay nodes into one or more groups according to at least the interference related detection and the negotiation results; and
   based on the grouping initiate a sub-frame configuration for the access node—relay node connection of each of the one or more groups of relay nodes such that the access node—relay node connection can be configured for each group in order to mitigate interference between transmissions to and from user equipment and to and from different relay nodes in each group.

2. The apparatus according to claim 1, wherein the at least one memory and the computer program code are further configured to, with the at least one processor, cause the apparatus to: group the relay nodes also based on connection requirements for the access node—relay node connection.

3. The apparatus according to claim 1, wherein the apparatus is or is a part of a network management entity.

4. The apparatus according to claim 1, wherein the at least one memory and the computer program code are further configured to, with the at least one processor, cause the apparatus to:
   inform the access nodes and the relay nodes of each of the one or more groups about the grouping.

5. The apparatus according to claim 1, wherein the apparatus is the access node or is a part of the access node, or is one of the relay nodes or a part of one of the relay nodes.

6. The apparatus according to claim 1, wherein the at least one memory and the computer program code are further configured to, with the at least one processor, cause the apparatus to perform at least the following:
   identify relay nodes causing interference to other relay nodes based on the obtained interference related detection results; wherein the grouping is based on identified ones of the relay nodes that are causing interference, and wherein the grouping comprises informing a neighbour access node serving a relay node causing interference to implement the grouping.

7. The apparatus according to claim 1, wherein the negotiating comprises indications of at least one of an agreement and a disagreement to the grouping using a communicated pre-determined number of hand-shake procedures.

8. The apparatus according to claim 1, wherein the grouping is different for uplink communication versus downlink communication.

9. The apparatus according to claim 1, wherein the at least one memory and the computer program code are further configured to, with the at least one processor, cause the apparatus to:
   send a sub-frame configuration proposal message including a proposed sub-frame configuration to a neighbour access node with a relay node in a same group, or to a relay node in the same group;
   receive a response message in response to the sub-frame configuration proposal message including one of confirmation of the proposed sub-frame configuration and a new sub-frame configuration proposed by the neighbour access node, and
   determine a sub-frame configuration based on the response message.

10. The apparatus according to claim 9, wherein the at least one memory and the computer program code are further configured to, with the at least one processor, cause the apparatus to:
   send a confirmation of the determined sub-frame configuration in response to the response message including a confirmation message of the sub-frame configuration.

11. The apparatus according to claim 1, wherein the at least one memory and the computer program code are further configured to, with the at least one processor, cause the apparatus to:
   receive a sub-frame configuration proposal message including a proposal for a sub-frame configuration from the neighbour access node or relay node belonging to a same group;
   determine whether the proposed sub-frame configuration is acceptable or not; and
   send a response message in response to the configuration proposal message including confirmation of the proposed sub-frame configuration or a new proposed sub-frame configuration based on the result of the determining.

12. The apparatus according to claim 1, wherein the interference related detection results comprise at least one of interference measurement results, interference estimation results and received power measurement or estimation results.

13. The apparatus according to claim 1, wherein the sub-frame configuration comprises at least one of a transmission time interval and a slot configuration associated with each relay node of the plurality of relay nodes.

14. The apparatus according to claim 13, wherein the grouping the relay nodes comprises grouping relay nodes with a same at least one of a transmission time interval and a slot configuration, and wherein the at least one memory and the computer program code are further configured to, with the at least one processor, cause the apparatus to inform at least one access node of the radio access network of the at least one of a transmission time interval and a slot configuration of the grouping to configure the access node—relay node connection.

15. An apparatus comprising:
at least one processor; and
at least one memory including computer program code, the at least one memory and the computer program code configured to, with the at least one processor, cause the apparatus to perform at least the following:
provide interference related detection results of at least one relay node associated with the apparatus, wherein the interference related detection results comprise indication of interference occurring at least between the at least one relay node and one or more other relay nodes associated with the apparatus, wherein the relay node is capable of being wirelessly connected to a radio access network and serves to connect at least one user equipment which is wirelessly connected via the at least one relay node to the radio access network;
send the interference related detection results to a network management entity for grouping the relay nodes according to the obtained detection results;
receive information about a proposed group to which the apparatus and the at least one relay node belong and a sub-frame configuration for the proposed group in order to mitigate the interference;
determine whether the proposed grouping is acceptable or not, and
send a response message in response to the grouping proposal including confirmation that the proposed grouping is acceptable or a new proposed grouping based on result of the determining.

16. The apparatus according to claim 15, wherein the at least one memory and the computer program code are further configured to, with the at least one processor, cause the apparatus to:

negotiate with one or more neighbour access nodes or one or more relay nodes in order to form one of the proposed group or the new proposed group.

17. A method comprising:
obtaining interference related detection results of interference occurring at least between a plurality of relay nodes, wherein each relay node of the plurality of relay nodes is capable of being wirelessly connected to a radio access network, is associated with an access node of the radio access network, and serves to connect at least one user equipment which is wirelessly connected to the radio access network, wherein a connection between the relay node and its serving access node is an access node - relay node connection;
negotiating at least one of a grouping and a subframe configuration with one or more neighbour access nodes;
grouping the relay nodes into one or more groups according to at least the interference related detection and the negotiation results; and
based on the grouping, initiating a sub-frame configuration for the access node—relay node connection of each of the one or more groups of relay nodes such that the access node—relay node connection can be configured for each group in order to mitigate interference between transmissions to and from user equipment and to and from different relay nodes in each group.

18. The method according to claim 17, further comprising identifying relay nodes causing interference to other relay nodes based on the obtained interference related detection results, wherein the grouping is based on identified ones of the relay nodes that are causing interference; and
informing a neighbour access node serving a relay node causing interference to perform the grouping.

19. The method according to claim 17, further comprising determining a sub-frame configuration of the access node—relay node connection for each group in order to mitigate the interference between transmissions to the user equipment and to the different relay nodes in each group or from the user equipment and from the different relay nodes in each group.

20. The method according to claim 17, further comprising obtaining information regarding a channel quality of the access node—relay node connections, determining a configuration of the access node—relay node connections for each group according to the obtained information; and
informing the access nodes about the configuration for each relay node.

21. A computer program product comprising a non-transitory computer readable storage medium for performing a method according to claim 17 when run on a computer system.

* * * * *